US011812745B2

(12) United States Patent
Reddy et al.

(10) Patent No.: US 11,812,745 B2
(45) Date of Patent: Nov. 14, 2023

(54) METHOD OF IMPROVING STRESS TOLERANCE, GROWTH AND YIELD IN PLANTS

(71) Applicant: Valent BioSciences LLC, Libertyville, IL (US)

(72) Inventors: Srirama Krishna Reddy, Libertyville, IL (US); Brian Sopcak, Streamwood, IL (US)

(73) Assignee: VALENT BIOSCIENCES LLC, Libertyville, IL (US)

( * ) Notice: Subject to any disclaimer, the term of this patent is extended or adjusted under 35 U.S.C. 154(b) by 0 days.

(21) Appl. No.: 17/180,120

(22) Filed: Feb. 19, 2021

(65) Prior Publication Data

US 2021/0259244 A1 Aug. 26, 2021

Related U.S. Application Data

(60) Provisional application No. 62/979,133, filed on Feb. 20, 2020.

(51) Int. Cl.
*A01N 37/10* (2006.01)
*A01N 47/36* (2006.01)
*A01N 43/90* (2006.01)

(52) U.S. Cl.
CPC ............. *A01N 37/10* (2013.01); *A01N 43/90* (2013.01); *A01N 47/36* (2013.01)

(58) Field of Classification Search
CPC ........ A01N 37/36; A01N 37/42; A01N 45/00; A01N 47/20; A01N 43/90; A01N 47/36; A01H 43/12; A01H 43/16; A01H 43/60; A01H 43/90; A01H 43/653; A01H 57/16
See application file for complete search history.

(56) References Cited

U.S. PATENT DOCUMENTS

| 9,023,762 | B2 * | 5/2015 | Devisetty | A01N 43/90 504/136 |
| 9,609,866 | B2 | 4/2017 | Devisetty et al. | |
| 2008/0254988 | A1 * | 10/2008 | Wang | A01N 37/42 504/142 |

FOREIGN PATENT DOCUMENTS

| CN | 1318300 A | 10/2001 | |
| WO | 2001/067861 A1 | 9/2001 | |
| WO | WO-02087329 A1 * | 11/2002 | ............. A01N 33/12 |

OTHER PUBLICATIONS

Quamruzzaman et al, "Improving Performance of Salt-Grown Crops by Exogenous Application of Plant Growth Regulators," Biomolecules 2021, 11, 788. https://doi.org/10.3390/biom11060788, downloaded from https://www.mdpi.com/journal/biomolecules on Jul. 13, 2021.*

Ha et al. Cytokinins: metabolism and function in plant adaptation to environmental stresses, Trends in Plant Science, Mar. 2012, vol. 17, No. 3, pp. 172-179.*
Yang et al, 2014, Effect of exogenous ABA application on post-anthesis dry matter redistribution and grain starch accumulation of winter wheat with different staygreen characteristics, Science Direct, The Crop Journal 2 (2014), 144-153, downloaded from www.sciencedirect.com.*
Yang et al, 2016, Exogenous Cytokinins Increase Grain Yield of Winter Wheat Cultivars by Improving Stay-Green Characteristics under Heat Stress, PLOSIone, pp. 1-19, downloaded from https://www.ncbi.nlm.nih.gov/pmc/articles/PMC4874672/pdf/pone.0155437.pdf.*
Bano and Yasmeen, Role of Phytohormones under induced drought in wheat, Pak. J. Bot., 42(4): 2579-2587, 2010, downloaded from https://www.pakbs.org/pjbot/PDFs/42(4)/PJB42(4)2579.pdf).*
Agronomic Crops Network, Ohio State Extension, What is the Meaning of Feekes Growth Stages in Wheat? C.O.R.N. Newsletter, Jul. 2016, downloaded from https://agcrops.osu.edu/newsletter/corn-newsletter/what-meaning-feekes-growth-stages-wheat.*
Sarafraz-Ardakani et al, "Abscisic acid and cytokinin-induced carbohydrate and antioxidant levels regulation in drought-resistant and -susceptible wheat cultivar during grain filling under field conditions", Int. J. Biosci., International Journal of Biosciences, vol. 5, No. 8, http://www.innspub.net (Year: 2014).*
Shi et al., Differences in Sugar Accumulation and Mobilization between Sequential and NonSequential Senescence Wheat Cultivars under Natural and Drought Conditions. PLoS ONE 11(11): e0166155. doi:10.1371/journal.pone.0166155 https://doi.org/10.1371/journal.pone. 0166155 (Year: 2016).*
Sarafraz-Ardakani et al ("Abscisic acid and cytokinin-induced carbohydrate and antioxidant levels regulation in drought-resistant and -susceptible wheat cultivar during grain filling under field conditions", Int. J. Biosci., International Journal of Biosciences, ISSN: 2220-6655 (print), 222-5234 (Online) http://ww.*
Shi et al (Shi H, Wang B, Yang P, Li Y, Miao F (2016) Differences in Sugar Accumulation and Mobilization between Sequential and NonSequential Senescence Wheat Cultivars under Natural and Drought Conditions. PLoS ONE 11(11): e0166155. doi:10.1371/journal.pone.0166155 https://doi.org/10.1371/journal.pone. 0166155).*
Gashaw et al (CPPU elevates photosynthetic abilities, growth performance and yield traits in salt stressed rice (*Oryza sativa* L. spp. *Indica*) via free proline and sugar accumulation, Gashaw et al., Pesticide Biochemistry and Physiology 108 (2014) 27-33, downloaded from http://dx.doi.org/10.1016/j.pestbp.2013.11.00.*
Knott, Identifying Wheat Growth Stages, University of Kentucky College of Agriculture, Food and Environment, AGR-224, 2016, 8 pp. (Year: 2016).*
Sarafraz-Ardakani et al. Abscisic acid and cytokinin-induced carbohydrate and antioxidant levels regulation in drought-resistant and susceptible wheat cultivar during grain filling under field conditions, Int. J. Biosci., vol. 5, No. 8, 2014, 11-24. (Year: 2014).*
Singh et al. Effect of Forchlorfenuron on growth and yield of Rice (*Oryza sativa* L.) during Kharif season of Central India, Int., J. Curr Microbiol. App. Sci. (2019) 8(9): 2331-2338. (Year: 2019).*

(Continued)

*Primary Examiner* — June Hwu
(74) *Attorney, Agent, or Firm* — Wood, Phillips, Katz, Clark & Mortimer

(57) ABSTRACT

The present invention relates to a method of improving growth and yield in wheat plants by applying an effective amount of a mixture of (S)-abscisic acid and forchlorfenuron The present invention relates to a method of improving stress tolerance in plants.

3 Claims, No Drawings

(56) References Cited

OTHER PUBLICATIONS

Travaglia et al. Exogenous Abscisic Acid Increases Carbohydrate Accumulation and Redistribution to the Grains in Wheat Grown Under Field Conditions of Soil Water Restriction, J Plant Growth Regul (2007) 26: 285-289. (Year: 2007).*
Google Patent translation WO02087329A1, 12 pp. (Year: 2023).*
Quamruzzaman et al. "Improving Performance of Salt-Grown Crops by Exogenous Application of Plant Growth Regulators," Biomolecules 2021, 11, 788, https://doi.org/10.3390/bio11060788, downloaded from http://www.mdpi.com/journal/biomolecules on Jul. 13, 2021, pp. 1-22. (Year: 2021)*
Agronomic Crops Network, Ohio State Extension, What is the Meaning of Feekes Growth Stages in Wheat? C.O.R.N. Newsletter, Jul. 2016, down loaded from https://agcrops.osu.edu/newsletter/com-newsletter/what-meaning-feekes-growth-stages-wheat, 6 pp. (Year: 2016).*
Sarafraz-Ardakani et al. Abscisic acid and cytokinin-induced carbohydrate and antioxidant levels regulation in drought-resistant and -susceptible wheat cultivar during grain filling under field conditions, Int. J. Biosci., International Journal of Biosciences, vol. 5, No. 8, pp. 11-24, 2014 (Year: 2014).*
Shi et al. Differences in Sugar Accumulation and Mobilization between Sequential and Non-Sequential Senescence Wheat Cultivars under Natural and Drought Conditions. 2016, PLoS ONE 11(11): e0166155. doi:10.1371/journal.pone.0166155, pp. 1-17. (Year: 2016).*
International Search Report and Written Opinion dated May 26, 2021.
Ioannis et al., "10—Cereal Waste Management: Treatment Methods and Potential Uses of Treated Waste", Editor(s): Ioannis S. Arvanitoyannis, in Food Science and Technology, Waste Management for the Food Industries, Academic Press, 2008, pp. 629-631, ISBN 9780123736543, [Retrieved on Apr. 15, 2021] Retrived from interne! <URL:https://doi.org/10.1016/8978-012373654-3.50013-4>, especially p. 630.
Vishwakarma et al., "Abscisic Acid Signaling and Abiotic Stress Tolerance in Plants: A Review on Current Knowledge and Future Prospects", Frontiers in Plant Science, vol. 8, 2017, [Retrieved on Apr. 15, 2021) Retrived from internet: <URL:https://www.frontiersin.org/article/10.3389/fpls.2017.00161 > <DOI:10.3389/fpls.2017.00161>, especially p. 1 and 6.
PubChem CID 6238927, May 27, 2005 (May 27, 2005) [Retrived on Apr. 15, 2021] Retrived from internet: <URL: https://pubchem.ncbi.nlm.nih.gov/compound/6-Benzylaminopurine> especially p. 1, synonyms.
Yang, J., et al. Abscisic acid and cytokinins in the root exudates and leaves and their relationship to senescence and remobilization of carbon reserves in rice subjected to water stress during grain filling. Planta. Aug. 2002;215(4):645-52. doi: 10.1007/s00425-002-0789-2. Epub Jun. 20, 2002.
Pospislova, J et al., Interactions between abscisic acid and cytokinins during water stress and subsequent rehydration, Biologia Plantarum, Dec. 2005, 49(4), 533-540.
Lahijani, MJA, et al., Effect of 6-Benzylaminopurine and Abscisic Acid on Gas Exchange, Biochemical Traits, and Minituber Production of Two Potato Cultivars (*Solanum tuberosum* L.), J. Agr. Sci. Tech. (2018), 20, 129-139.

\* cited by examiner

METHOD OF IMPROVING STRESS TOLERANCE, GROWTH AND YIELD IN PLANTS

FIELD OF THE INVENTION

The present invention relates to methods of improving growth and yield in plants by applying an effective amount of a mixture of (S)-abscisic acid and one or more cytokinins to the plant. The present invention further relates to methods of improving stress tolerance in plants by applying an effective amount of a mixture of (S)-abscisic acid and one or more cytokinins to the plant.

BACKGROUND OF THE INVENTION

Growers continually attempt to grow the most productive crops possible in order to maximize yields. Plant growth regulators are among the best tools that growers can use to influence the growth of plants based on the restrictions of water and temperature. The effects of plant growth regulators on plants under different conditions can vary widely. Furthermore, it is difficult to predict the effect of simultaneously applying more than one plant growth regulator to the plant.

(S)-abscisic acid ("ABA") is an endogenous plant growth regulator with many roles in growth and development. For example, ABA inhibits seed germination by antagonizing gibberellins that stimulate the germination of seeds. ABA promotes stress tolerance and maintains growth under stress conditions (see Sharp R E et al. *J Exp Bot,* 2004 55:2343-2351). Interestingly, several studies have shown that maintaining 'normal' ABA levels in well-watered plants is required to maintain shoot growth in tomato (Sharp R E et al., *J Exp Bot,* 2000 51:1575-1584) and *Arabidopsis thaliana* (LeNoble M E et al. *J Exp Bot,* 2004 55:237-245). Moreover, ABA is responsible for the development and maintenance of dormancy in seeds and woody plants, which when deficient in ABA often demonstrate pre-harvest sprouting of seeds due to a lack of dormancy induction.

Further, applications of ABA have also been shown to provide protection from chilling and drought, as well as to increase the red color of seedless table grapes. Examples of effective commercially available ABA formulations include ProTone™ and Contego™ (available from Valent BioSciences LLC).

Cytokinins are plant growth regulators that regulate cell division in plant shoots and organs. Exogenous cytokinins are applied in agricultural settings to increase yield of plants. Cytokinins have also been shown to increase production in cotton under drought conditions. Yao S (March 2010). "Plant Hormone Increases Cotton Yields in Drought Conditions". *News & Events.* Agricultural Research Service (ARS), U.S. Department of Agriculture.

Previous applications have suggested that ABA and benzyladenine could be used to enhance fruit quality by reducing the number of fruits on a plant by thinning. See, U.S. Pat. No. 8,173,577 demonstrating that application of ABA and benzyladenine during flowering or fruiting stage of the plant reduced the number of developed fruits on the plant.

However, it is unclear if plant growth would benefit from the co-application of ABA and cytokinins. Accordingly, there is a need in the art for new methods to improve the growth of plants, including under abiotic stress conditions.

SUMMARY OF THE INVENTION

In another aspect, the present invention is directed to methods of improving plant growth comprising applying an effective amount of a mixture of (S)-abscisic acid ("ABA") and one or more cytokinins to the plant, wherein the weight ratio of ABA to the one or more cytokinins is from about 10:1 to about 1:10 and wherein the plant is a cereal crop.

In one aspect, the present invention is directed to methods of improving stress tolerance in a plant comprising applying an effective amount of a mixture of (S)-abscisic acid ("ABA") and one or more cytokinins to the plant, wherein the weight ratio of ABA to the one or more cytokinins is from about 10:1 to about 1:10 and wherein the plant is a cereal crop.

DETAILED DESCRIPTION OF THE INVENTION

Applicant unexpectedly discovered that a mixture of (S)-abscisic acid ("ABA") and cytokinins improved plant growth. Applicant further discovered that a mixture of ABA and cytokinins improved drought stress tolerance and plant growth under drought stress conditions.

In one embodiment, the present invention is directed to a method of improving plant growth comprising applying an effective amount of a mixture of ABA and one or more cytokinins to the plant, wherein the weight ratio of ABA to the one or more cytokinins is from about 10:1 to about 1:10 and wherein the plant is a cereal crop.

In another embodiment, the present invention is directed to a method of improving stress tolerance in a plant comprising applying an effective amount of a mixture of ABA and one or more cytokinins to the plant, wherein the weight ratio of ABA to the one or more cytokinins is from about 10:1 to about 1:10 and wherein the plant is a cereal crop.

In one embodiment, the present invention is directed to a method of improving plant growth comprising applying an effective amount of a mixture of ABA and one or more cytokinins to the plant, wherein the weight ratio of ABA to the one or more cytokinins is from about 10:1 to about 1:10, wherein the plant is a cereal crop and wherein the one or more cytokinins are 6-benzyladenine or forchlorfenuron.

In a preferred embodiment, ABA and one or more cytokinins are applied at a weight ratio from about 6:1 to about 1:1.5, more preferably from about 4:1 to about 1:1, even more preferably from 4:1 to 1.1:1 and yet even more preferably at about 6:1, about 4:1, 4:1, about 3:1, about 1:1 or about 1:1.5.

Cytokinins suitable for use in the present invention include, but are not limited to, adenine and its salts, derivatives and conjugates such as adenine hydrochloride, adenine hemisulfate, adenosine, $N^6$-benzyladenine (6-benzyladenine), $N^6$-benzyladenine hydrochloride, $N^6$-benzyladenosine, $N^6$-benzyladenine-3-glucoside, $N^6$-benzyladenine-7-glucoside, $N^6$-benzyladenine-9-glucoside, $N^6$-benzyl-9-(2-tetrahydropyranyl)adenine, $N^6$-benzyladenosine-5'-monophosphate sodium salt, $N^6$-(3-fluorobenzyl)adenine, $N^6$-(3-fluorobenzyl)adenosine, $N^6$-isopentenyladenine, $N^6$-isopentenyladenine hydrochloride, $N^6$-isopentenyladenosine, $N^6$-(2-isopentenyl)adenine, 2-benzylthio-$N^6$-isopentenyladenine, 2-methylthio-$N^6$-isopentenyladenine, 2-methylthio-$N^6$-isopentenyladenosine, 2-mercapto-$N^6$-isopentenyladenine, $N^6$-isopentenyladenine-3-glucuronide, $N^6$-isopentenyladenine-3-glucuronide amide, $N^6$-isopentenyladenosine-5'-monophosphate sodium salt, $N^6$-isopentenyladenine-7-glucoside, $N^6$-isopentenyladenine-9-glucoside, $N^6$-cyclopentyladenosine-5'-monophosphate sodium salt and phenyladenine;

zeatin and its salts, derivatives and conjugates such as dihydrozeatin, dihydrozeatin hydrochloride, dihydrozeatin riboside, dihydrozeatin-7-glucoside, dihydrozeatin-9-glucoside, dihydrozeatin-o-glucoside, dihydrozeatin-o-glucoside riboside, dihydrozeatin riboside-5'-monophosphate sodium salt, dihydrozeatin-o-acetyl, trans-zeatin, trans-zeatin hydrochloride, trans-zeatin riboside, zeatin riboside, trans-zeatin-7-glucoside, trans-zeatin-9-glucoside, trans-zeatin-9-glucuronide, trans-zeatin-o-glucoside, trans-zeatin-o-glucuronide, trans-zeatin-o-glucoside riboside, trans-zeatin riboside-5'-monophosphate sodium salt, trans-zeatin-9-glucoside-o-glucoside, trans-zeatin-o-acetyl, 2-chloro-trans-zeatin, rs (+/−)-trans-methylzeatin, 2-methylthio-trans-zeatin, 2-methylthio-trans-zeatin riboside, cis-zeatin, cis-zeatin riboside, cis-zeatin-9-glucoside, cis-zeatin-7-glucoside, cis-zeatin-o-glucoside, cis-zeatin-o-glucoside riboside, cis-zeatin riboside-5'-monophosphate sodium salt, 2-methylthio-cis-zeatin, and 2-methylthio-cis-zeatin riboside;
kinetin and its salts, derivatives and conjugates such as kinetin hydrochloride, kinetin riboside, kinetin-3-glucoside, kinetin-9-glucoside, and kinetin riboside-5'-monophosphate sodium salt; topolin and its salts, derivatives and conjugates such as meta-topolin, meta-topolin riboside, meta-topolin-9-glucoside, meta-topolin-7-glucoside, meta-topolin riboside-5'-monophosphate sodium salt, meta-topolin-9-tetrahydropyranyl, ortho-topolin, ortho-topolin riboside, ortho-topolin-9-glucoside, ortho-topolin-7-glucoside, ortho-topolin riboside-5'-monophosphate sodium salt, para-topolin, para-topolin riboside, para-topolin-9-glucoside, para-topolin-7-glucoside, para-topolin riboside-5'-monophosphate sodium salt, ortho-methoxytopolin, ortho-methoxytopolin riboside, ortho-methoxytopolin-9-glucoside, meta-methoxytopolin, meta-methoxytopolin riboside, meta-methoxytopolin-9-glucoside, meta-methoxytopolin-9-tetrahydropyranyl, para-methoxytopolin riboside, and para-methoxytopolin-9-glucoside; and others such as n-(2-chloro-4-pyridyl)-n'-phenylurea (forchlorfenuron), fusatine, 2-chloro-fusatine, hypoxanthine, nebularine, thidiazuron, 2-chloro-6-(3-methoxybenzylamino)purine.

In a preferred embodiment, the one or more cytokinins are selected from the group consisting of 6-benzyladenine ("6BA"), forchlorfenuron ("CPPU"), thidiazuron, trans-zeatin, 2-isopentyl adenine, meta topolin, trans topolin, kinetin and salts thereof and sugar conjugates thereof. In a more preferred embodiment, the one or more cytokinins is 6BA or CPPU. Examples of effective commercially available 6BA formulations include MaxCel® (MaxCel is a registered trademark and available from Valent BioSciences LLC). Examples of effective commercially available CPPU formulations include Prestige® (Prestige is a registered trademark of and available from Valent BioSciences LLC).

In another embodiment, the plant is a monocotyledonous plant or a dicotyledonous plant. In a preferred embodiment the plant is selected from the group consisting of root, corm and tuber vegetable plants, bulb vegetable plants, leafy non-brassica vegetable plants, leafy brassica vegetable plants, succulent or dried legume plants, fruiting vegetable plants, cucurbit vegetable plants, citrus fruit plants, pome fruit plants, stone fruit plants, berry and small fruit plants, tree nut plants, cereal crops, forage and fodder grasses and hay, tall perennial grasses, non-grass animal feed plants, herb plants, spice plants, flower plants, bedding plants, ornamental flower plants, artichoke, asparagus, tropical fruit plants, hops, malanga, peanut, pomegranate plants, oil seed vegetable plants, tobacco plants, turf grass and watercress plant. In a more preferred embodiment, the plant is wheat, rice or barley and yet more preferably the cereal crop is wheat or rice.

In a preferred embodiment, the root, corm and tuber vegetable plants are selected from the group consisting of arracacha, arrowroot, Chinese artichoke, Jerusalem artichoke, garden beet, sugar beet, edible burdock, edible canna, carrot, bitter cassava, sweet cassava, celeriac, root chayote, turnip-rooted chervil, chicory, chufa, dasheen (taro), ginger, ginseng, horseradish, leren, turnip-rooted parsley, parsnip, potato, radish, oriental radish, rutabaga, salsify, black salsify, Spanish salsify, skirret, sweet potato, tanier, turmeric, turnip, yam bean, true yam, and cultivars, varieties and hybrids thereof.

In another preferred embodiment, the bulb vegetable plants are selected from the group consisting of fresh chive leaves, fresh Chinese chive leaves, bulb daylily, elegans hosta, bulb fritillaria, fritillaria leaves, bulb garlic, great-headed bulb garlic, serpent bulb garlic, kurrat, lady's leek, leek, wild leek, bulb lily, Beltsville bunching onion, bulb onion, Chinese bulb onion, fresh onion, green onion, macrostem onion, pearl onion, potato bulb onion, potato bulb, tree onion tops, Welsh onion tops, bulb shallot, fresh shallot leaves, and cultivars, varieties and hybrids thereof.

In a further embodiment, the leafy non-brassica vegetable plants are selected from the group consisting of Chinese spinach Amaranth, leafy Amaranth, arugula (roquette), cardoon, celery, Chinese celery, celtuce, chervil, Chinese spinach, edible-leaved chrysanthemum, garland chrysanthemum, corn salad, garden cress, upland cress, dandelion, dandelion leaves, sorrels (dock), endive (escarole), Florence fennel, head lettuce, leaf lettuce, orach, parsley, garden purslane, winter purslane, radicchio (red chicory), rhubarb, spinach, New Zealand spinach, vine spinach, Swiss chard, Tampala, and cultivars, varieties and hybrids thereof.

In another embodiment, the leafy brassica vegetable plants are selected from the group consisting of broccoli, Chinese broccoli (gai lon), broccoli raab (rapini), Brussels sprouts, cabbage, Chinese cabbage (bok choy), Chinese napa cabbage, Chinese mustard cabbage (gai choy), cauliflower, cavalo broccoli, collards, kale, kohlrabi, mizuna, mustard greens, mustard spinach, rape greens, turnip greens and cultivars, varieties and hybrids thereof. In yet another embodiment, the succulent or dried vegetable legumes are selected from the group consisting of *Lupinus* beans, *Phaseolus* beans, *Vigna* beans, broad beans (fava), chickpea (garbanzo), guar, jackbean, lablab bean, lentil, *Pisum* peas, pigeon pea, sword bean, peanut, and cultivars, varieties and hybrids thereof. In a preferred embodiment, the *Lupinus* beans include grain lupin, sweet lupin, white lupin, white sweet lupin, and hybrids thereof. In another preferred embodiment, the *Phaseolus* beans include field bean, kidney bean, lima bean, navy bean, pinto bean, runner bean, snap bean, tepary bean, wax bean, and hybrids thereof. In yet another preferred embodiment, the *Vigna* beans include adzuki bean, asparagus bean, blackeyed bean, catjang, Chinese longbean, cowpea, Crowder pea, moth bean, mung bean, rice bean, southern pea, urd bean, yardlong bean, and hybrids thereof. In another embodiment, the *Pisum* peas include dwarf pea, edible-podded pea, English pea, field pea, garden pea, green pea, snow pea, sugar snap pea, and hybrids thereof. In a preferred embodiment, the dried vegetable legume is soybean. In a more preferred embodiment, the dried vegetable legume is genetically modified soybean.

In a further embodiment, the fruiting vegetable plants are selected from the group consisting of bush tomato, cocona, currant tomato, garden huckleberry, goji berry, groundcherry, martynia, naranjilla, okra, pea eggplant, pepino, bell peppers, non-bell peppers, roselle, eggplant, scarlet eggplant, African eggplant, sunberry, tomatillo, tomato, tree tomato, and cultivars, varieties and hybrids thereof. In a preferred embodiment, the peppers include bell peppers, chili pepper, cooking pepper, pimento, sweet peppers, and hybrids thereof.

In an embodiment, the cucurbit vegetable plants are selected from the group consisting of Chayote, Chayote fruit, waxgourd (Chinese preserving melon), citron melon, cucumber, gherkin, edible gourds, *Momordica* species, muskmelons, pumpkins, summer squashes, winter squashes, watermelon, and cultivars, varieties and hybrids thereof. In a preferred embodiment, edible gourds include hyotan, cucuzza, hechima, Chinese okra, and hybrids thereof. In another preferred embodiment, the *Momordica* vegetables include balsam apple, balsam pear, bittermelon, Chinese cucumber, and hybrids thereof. In another preferred embodiment, the muskmelon include true cantaloupe, cantaloupe, casaba, crenshaw melon, golden pershaw melon, honeydew melon, honey balls, mango melon, Persian melon, pineapple melon, Santa Claus melon, snake melon, and hybrids thereof. In yet another preferred embodiment, the summer squash include crookneck squash, scallop squash, straightneck squash, vegetable marrow, zucchini, and hybrids thereof. In a further preferred embodiment, the winter squash includes butternut squash, calabaza, hubbard squash, acorn squash, spaghetti squash, and hybrids thereof.

In another embodiment, the citrus fruit plants are selected from the group consisting of limes, calamondin, citron, grapefruit, Japanese summer grapefruit, kumquat, lemons, Mediterranean mandarin, sour orange, sweet orange, pummelo, Satsuma mandarin, tachibana orange, tangelo, mandarin tangerine, tangor, trifoliate orange, uniq fruit, and cultivars, varieties and hybrids thereof. In a preferred embodiment, the limes are selected from the group consisting of Australian desert lime, Australian finger lime, Australian round lime, Brown River finger lime, mount white lime, New Guinea wild lime, sweet lime, Russell River lime, Tahiti lime, and hybrids thereof.

In an embodiment, the pome fruit plants are selected from the group consisting of apple, azarole, crabapple, loquat, mayhaw, medlar, pear, Asian pear, quince, Chinese quince, Japanese quince, tejocote, and cultivars, varieties and hybrids thereof.

In another embodiment, the stone fruit plants are selected from the group consisting of apricot, sweet cherry, tart cherry, nectarine, peach, plum, Chicksaw plum, Damson plum, Japanese plum, plumcot, fresh prune, and cultivars, varieties and hybrids thereof.

In a further embodiment, the berries and small fruit plants are selected from the group consisting of Amur river grape, aronia berry, bayberry, bearberry, bilberry, blackberry, blueberry, lowbush blueberry, highbush blueberry, buffalo currant, buffaloberry, che, Chilean guava, chokecherry, cloudberry, cranberry, highbush cranberry, black currant, red currant, elderberry, European barberry, gooseberry, grape including wine and table grapes, edible honeysuckle, huckleberry, jostaberry, Juneberry (Saskatoon berry), lingonberry, maypop, mountain pepper berries, mulberry, muntries, native currant, partridgeberry, phalsa, pincherry, black raspberry, red raspberry, riberry, salal, sea buckthorn, serviceberry, strawberry, wild raspberry, and cultivars, varieties and hybrids thereof. In a preferred embodiment, the blackberries include Andean blackberry, arctic blackberry, bingleberry, black satin berry, boysenberry, brombeere, California blackberry, Chesterberry, Cherokee blackberry, Cheyenne blackberry, common blackberry, coryberry, darrowberry, dewberry, Dirksen thornless berry, evergreen blackberry, Himalayaberry, hullberry, lavacaberry, loganberry, lowberry, Lucreliaberry, mammoth blackberry, marionberry, mora, mures deronce, nectarberry, Northern dewberry, olallieberry, Oregon evergreen berry, phenomenalberry, rangeberry, ravenberry, rossberry, cane berry, Shawnee blackberry, Southern dewberry, tayberry, youngberry, zarzamora, and hybrids thereof.

In another embodiment, the tree nut plants are selected from the group consisting of almond, beech nut, Brazil nut, Brazilian pine, bunya, butternut, bur oak, Cajou nut, candlenut, cashew, chestnut, chinquapin, coconut, coquito nut, dika nut, gingko, Guiana chestnut, hazelnut (filbert), heartnut, hickory nut, Japanese horse-chestnut, macadamia nut, mongongo nut, monkey-pot, monkey puzzule nut, Okari nut, Pachira nut, peach palm nut, pecan, Pili nut, pistachio, Sapucaia nut, tropical almond, black walnut, English walnut, yellowhorn, and cultivars, varieties and hybrids thereof.

As used herein, the term "cereal crops" refers to barley, buckwheat, pearl millet, proso millet, oats, rice, rye, sorghum (milo), sorghum species, grain sorghum, sudangrass (seed), teosinte, triticale, wheat, wild rice, and cultivars, varieties and hybrids thereof. In a more preferred embodiment, the cereal crop is selected from rice, oats, wheat, triticale, barley and rye. In an even more preferred embodiment, the cereal crop is wheat, rice or barley and yet more preferably the cereal crop is wheat or rice.

In yet another embodiment, the grass forage, fodder and hay are selected from the group consisting of grasses that are members of the Gramineae family except sugarcane and those species included in the cereal crops group, pasture and range grasses, and grasses grown for hay or silage. In further embodiments, the Gramineae grasses may be green or cured.

In yet another embodiment, the tall perennial grasses are those of the genus *Saccharum*, including sugarcanes and ornamental grasses.

In an embodiment, the non-grass animal feeds are selected from the group consisting of alfalfa, velvet bean, trifolium clover, melilotus clover, kudzu, lespedeza, lupin, sainfoin, trefoil, vetch, crown vetch, milk vetch, and cultivars, varieties and hybrids thereof.

In another embodiment, the herbs and spice plants are selected from the group consisting of allspice, angelica, anise, anise seed, star anise, annatto seed, balm, basil, borage, burnet, chamomile, caper buds, caraway, black caraway, cardamom, cassia bark, cassia buds, catnip, celery seed, chervil, chive, Chinese chive, cinnamon, clary, clove buds, coriander leaf, coriander seed, costmary, culantro leaves, culantro seed, cilantro leaves, cilantro seed, cumin, dillweed, dill seed, fennel, common fennel, Florence fennel seed, fenugreek, grains of paradise, horehound, hyssop, juniper berry, lavender, lemongrass, leaf lovage, seed lovage, mace, marigold, marjoram, mint, mustard seed, nasturtium, nutmeg, parsley, pennyroyal, black pepper, white pepper, poppy seed, rosemary, rue, saffron, sage, summer savory, winter savory, sweet bay, tansy, tarragon, thyme, vanilla, wintergreen, woodruff, wormwood, and cultivars, varieties and hybrids thereof. In a preferred embodiment, the mints are selected from the group consisting of spearmint, peppermint, and hybrids thereof.

In yet another embodiment, artichokes are selected from the group consisting of Chinese artichoke, Jerusalem artichoke, and cultivars, varieties and hybrids thereof.

In an embodiment, the tropical fruit plants are selected from the group consisting of anonna, avocado, fuzzy kiwifruit, hardy kiwifruit, banana, plantain, caimito, carambola (star fruit), guava, longan, sapodilla, papaya, passion fruit, mango, lychee, jackfruit, dragon fruit, mamey sapote, coconut cherimoya, canistrel, monstera, wax jambu, pomegranate, rambutan, pulasan, Pakistani mulberry, langsat, chempedak, durian, fig pineapple, jaboticaba, mountain apples, and cultivars, varieties and hybrids thereof.

In a further embodiment, the oil seed vegetable plants are selected from the group consisting of borage, calendula, castor oil plant, tallowtree, cottonseed, crambe, cuphea, echium, euphorbia, evening primrose, flax seed, gold of pleasure, hare's ear, mustard, jojoba, lesquerella, lunaria, meadowfoam, milkweed, niger seed, oil radish, poppy seed, rosehip, sesame, stokes aster, sweet rocket, tallowwood, tea oil plant, vermonia, canola, or oil rapeseed, safflower, sunflower, and cultivars, varieties and hybrids thereof.

In a further preferred embodiment, the plant is selected from the group consisting of corn, sorghum, millet and soybean. In a more preferred embodiment, the plant is corn or soybean, even more preferably the corn is selected from field corn, sweet corn, seed corn and popcorn. In a more preferred embodiment, the crop is genetically modified corn.

In another embodiment, the plant in which plant growth is improved is subject to an abiotic stress.

In another embodiment, the plant is subjected to drought stress. As used herein, "drought stress" refers to watering conditions wherein plant growth is significantly slowed as compared to those where water availability is sufficient to support optimal growth and development.

In a preferred embodiment, the mixture of ABA and one or more cytokinins is applied prior to or during the advent of abiotic stress. When the intended stress is drought, application of ABA and one or more cytokinins occurs prior to or during drought stress.

In another preferred embodiment, from about 1 to 1,000 parts per million ("ppm") of ABA are applied to the plant, more preferably from about 10 to about 1,000 ppm, even more preferably from about 10 to about 100 ppm and yet even more preferably from about 10 to about 30 ppm and yet even more preferably at about 30 ppm.

In another preferred embodiment, from about 1 to 1,000 ppm of one or more cytokinins are applied to the plant, more preferably from about 5 to 1,000 ppm, even more preferably from about 5 to about 100 ppm and yet even more preferably from about 5 to about 45 ppm or from about 5 to about 10 ppm or from about 30 to about 45 ppm and yet even more preferably at about 10 ppm or about 30 ppm.

In another preferred embodiment, ABA is applied to the plant at a rate from about 0.1 to about 100 grams per hectare ("g/HA"), more preferably from about 1 to about 20 g/HA and most preferably from about 2 to about 12 g/HA.

In another preferred embodiment, one or more cytokinins are applied to the plant at a rate from about 0.1 to about 100 g/HA, more preferably from about 0.5 to about 10 g/HA and most preferably from about 1 to about 6 g/HA.

The ABA and cytokinins mixture can be applied by any convenient means. Those skilled in the art are familiar with the modes of application that include foliar applications such as spraying, dusting, and granular applications; soil applications including spraying, in-furrow treatments, or sidedressing. In a preferred embodiment, ABA and the one or more cytokinins are applied to the plant as a spray and even more preferably as a foliar spray. In another preferred embodiment, ABA and the one or more cytokinins are applied to the plant as a granular application.

In another preferred embodiment, the mixture of ABA and one or more cytokinins are applied to the plant during the development stage selected from the group consisting of growth stage, reproductive stage, ripening stage and a combination thereof. More preferably the mixture of ABA and one or more cytokinins are applied to:

wheat at Feekes stage 10 to 11.4, most preferably at Feekes stage 11;

rice at development stages R4 to R7, most preferably at development stages R5 to R6; corn at development stages R1 to R4, most preferably at development stages R2 to R3; soybean at development stages R3 to R6, most preferably at development stages R4 to R5; barley at Zadoks stage 6 to 8, most preferably at Zadoks stage 7.2.

In a preferred embodiment, the grain weight of the plant is improved following application of ABA and one or more cytokinins.

As used herein, "sugar conjugates" refers to riboside and glucoside modified compounds.

As used herein, "effective amount" refers to the amount of the ABA and/or cytokinins that will improve growth, drought stress tolerance, and/or yield. The "effective amount" will vary depending on the ABA and cytokinin concentrations, the plant species or variety being treated, the severity of the stress, the result desired, and the life stage of the plants, among other factors. Thus, it is not always possible to specify an exact "effective amount." However, an appropriate "effective amount" in any individual case may be determined by one of ordinary skill in the art.

As used herein, "improving" means that the plant has more of the quality than the plant would have had it if it had not been treated by methods of the present invention.

As used herein, all numerical values relating to amounts, weight percentages and the like are defined as "about" or "approximately" each particular value, namely, plus or minus 10% (±10%). For example, the phrase "at least 5% by weight" is to be understood as "at least 4.5% to 5.5% by weight." Therefore, amounts within 10% of the claimed values are encompassed by the scope of the claims.

The articles "a," "an" and "the" are intended to include the plural as well as the singular, unless the context clearly indicates otherwise.

The disclosed embodiments are simply exemplary embodiments of the inventive concepts disclosed herein and should not be considered as limiting, unless the claims expressly state otherwise.

The following examples are intended to illustrate the present invention and to teach one of ordinary skill in the art how to use the formulations of the invention. They are not intended to be limiting in any way.

EXAMPLES

Example 1—Increasing Grain Yield in Wheat Under Water Stress Conditions

Method 42 pots of Apogee wheat were grown in a greenhouse under ideal growing conditions. Specifically, wheat was planted in ProMix® growth media and grown for about—seven weeks in a growth cabinet at 24/18° C. day/night temperature under a 16/8 hour light/dark photoperiod. Next, spray applications of 0.025% v/v Latron B-1956® in water, 30 ppm ABA, 30 ppm 6BA, 10 ppm CPPU, a mixture of 30 ppm ABA and 30 ppm 6BA and a mixture of 30 ppm ABA and 10 ppm CPPU (n=7) were made using a tank sprayer at Feekes stage 11.0. Plants were then grown with no additional water for next 3-5 days until drought stress conditions and water-deficit stress-related phenotypes were apparent. Specifically, drought stress conditions are determined as when pots have lost 60-70% of stored soil water, as determined by determined gravimetrically by weighing pots, through evapotranspiration and water-deficit stress-related phenotypes include wilting and leaf-rolling. Plants were re-watered to bring soil moisture to saturation and subsequently grown under optimal conditions until physiological maturity. Plants were then destructively harvested and measured for spike weight, grain weight, yield per spike and harvest index. Harvest index is calculated by dividing pounds of grain by the total pounds of above ground biomass. Results can be seen in Table 1, below.

To determine if the mixtures provided unexpected results, the observed combined efficacy ("OCE") was divided by the expected combined efficacy ("ECE") to give an OCE/ECE ratio wherein the expected ECE is calculated by a variation of the Abbott method:

$$ECE=X+(X*(((A-X)/X)+((B-X)/X))-(((A-X)/X)*((B-X)/X)/100)),$$

wherein ECE is the expected combined efficacy and in which X is the control efficacy and A and B are the efficacy provided by the single active ingredients. If the ratio between the OCE of the mixture and the ECE of the mixture is greater than 1, then greater than expected interactions are present in the mixture. (Gisi, *The American Phytopathological Society*, 86:11, 1273-1279, 1996).

TABLE 1

| n = 7 | AI conc. (ppm) | Spike Weight (grams) | Grain Yield (grams) | Yield/Spike (grams) | Harvest Index |
|---|---|---|---|---|---|
| Control | 0 | 12.33 | 9.13 | 1.36 | 0.54 |
| ABA | 30 | 14.06 | 10.24 | 1.40 | 0.55 |
| 6BA | 30 | 11.29 | 7.84 | 1.14 | 0.49 |
| CPPU | 10 | 12.99 | 9.69 | 1.34 | 0.56 |
| ABA 6BA | 30 30 | 14.22 | 10.81 | 1.47 | 0.58 |
| ABA CPPU | 30 10 | 14.70 | 11.53 | 1.64 | 0.61 |
| OCE:ECE Ratio | | | | | |
| ABA 6BA | 30 30 | 1.09 | 1.21 | 1.25 | 1.16 |
| ABA CPPU | 30 10 | 1.00 | 1.07 | 1.19 | 1.07 |

Results

As seen in Table 1, above, the mixture of ABA and 6BA provided unexpected gain in spike weight, grain yield, yield per spike and harvest index at a ratio of 1:1. Further, ABA and CPPU provided unexpected gain in grain yield, yield per spike and harvest index at a ratio of 3:1. Thus, mixtures of ABA and cytokinins provide unexpected yield in plants undergoing drought stress.

Example 2—Increasing Grain Yield in Wheat Under Water Stress Conditions

Method

Thirty-two pots of Apogee wheat were grown in a greenhouse under ideal growing conditions. Specifically, wheat was planted in ProMix® growth media and grown for about seven weeks in a growth cabinet at 24/18° C. day/night temperature under a 16/8 hour light/dark photoperiod. Next, spray applications of 0.025% v/v Latron B-1956® in water, 30 ppm ABA, 30 ppm 6BA, and a mixture of 30 ppm ABA and 30 ppm 6BA (n=8) were made using a tank sprayer at Feekes stage 11.0. Plants were then grown with no additional water for the next 3-5 days until drought stress conditions and water-deficit stress-related phenotypes were apparent. Plants were re-watered to bring soil moisture to saturation and grown under optimal conditions until physiological maturity. Plants were then destructively harvested and measured for shoot weight, spike weight, grain yield, yield per spike and total above ground biomass. Results can be seen in Table 2, below.

TABLE 2

| n = 8 | AI conc. (ppm) | Shoot Weight (grams) | Spike Weight (grams) | Grain Yield (grams) | Yield/Spike (grams) | Total Above Ground Biomass (grams) |
|---|---|---|---|---|---|---|
| Control | 0 | 4.97 | 15.66 | 11.65 | 1.17 | 20.63 |
| ABA | 30 | 5.04 | 15.66 | 12.12 | 1.33 | 20.70 |
| 6BA | 30 | 5.00 | 14.97 | 11.22 | 1.21 | 19.98 |
| ABA 6BA | 30 30 | 5.65 | 16.96 | 12.66 | 1.38 | 22.60 |
| OCE:ECE Ratio | | | | | | |
| ABA 6BA | 30 30 | 1.11 | 1.13 | 1.08 | 1.01 | 1.13 |

Results

As seen in Table 2, above, the mixture of ABA and 6BA provided unexpected gain in shoot weight, spike weight, grain yield, and total above ground biomass at a ratio of 1:1. Thus, mixtures of ABA and cytokinins provide unexpected yield in plants undergoing drought stress.

Example 3—Increasing Grain Yield in Wheat Under Well-Watered Conditions

Method 32 pots of Apogee wheat were grown in a greenhouse under ideal growing conditions. Specifically, wheat was planted in ProMix® growth media and grown for about seven weeks in a growth cabinet at 24/18° C. day/night temperature under a 16/8 hour light/dark photoperiod. Next, spray applications of 0.025% v/v Latron B-1956® in water, 30 ppm ABA, 10 ppm CPPU, and a mixture of 30 ppm ABA and 10 ppm CPPU (n=8) were made using a tank sprayer at Feekes stage 11.0. A second chemical spray application was made seven days after first spray. Plants were then grown under ideal conditions for an additional 5-6 weeks until they reached physiological maturity. Plants were then destructively harvested and measured for spike weight, grain yield, yield per spike and total above ground biomass. Results can be seen in Table 3, below.

TABLE 3

| AI (ppm) | AI conc. (ppm) | Spike Weight (grams) | Grain Yield (grams) | Yield/Spike (grams) | Total Above Ground Biomass (grams) |
|---|---|---|---|---|---|
| Control | 0 | 12.22 | 8.66 | 1.04 | 16.37 |
| ABA | 30 | 11.60 | 8.49 | 1.04 | 15.38 |
| CPPU | 10 | 11.86 | 8.28 | 0.95 | 15.98 |
| ABA CPPU | 30 10 | 12.58 | 9.17 | 1.18 | 16.74 |
| OCE:ECE Ratio | | | | | |
| ABA CPPU | 30 10 | 1.12 | 1.13 | 1.23 | 1.12 |

Results

As seen in Table 3, above, the mixture of ABA and CPPU provided unexpected gain in spike weight, grain yield, yield per spike and total above ground biomass at a ratio of 3:1. Thus, mixtures of ABA and cytokinins provide unexpected yield in plants.

Example 4—Increasing Grain Yield in Wheat Under Water Stress Conditions

Method 72 pots of Apogee wheat were grown in a greenhouse under ideal growing conditions. Specifically, wheat was planted in ProMix® growth media and grown for about seven weeks in a growth cabinet at 24/18° C. day/night temperature under a 16/8 hour light/dark photoperiod. Next, spray applications of 0.025% v/v Latron B-1956® in water, 10 ppm ABA, 30 ppm ABA, 5 ppm CPPU, 10 ppm CPPU, a mixture of 10 ppm ABA and 5 ppm CPPU, a mixture of 30 ppm ABA and 5 ppm CPPU, a mixture of 10 ppm ABA and 10 ppm CPPU and a mixture of 30 ppm ABA and 10 ppm CPPU (n=8) were made using a tank sprayer at Feekes stage 11.0. Plants were then grown with no additional water for next 3-5 until drought stress conditions and water-deficit stress related phenotype was apparent. Plants were re-watered to bring soil moisture to saturation and grown under optimal conditions until physiological maturity. Plants were then destructively harvested and measured for spike weight, grain yield, yield per spike and total above ground biomass. Results can be seen in Table 4, below.

TABLE 4

| n = 8 | AI conc. (ppm) | Spike Weight (grams) | Grain Yield (grams) | Yield/Spike (grams) | Total Above Ground Biomass (grams) |
|---|---|---|---|---|---|
| Control | 0 | 8.92 | 6.56 | 1.01 | 11.71 |
| ABA | 10 | 9.22 | 6.95 | 1.08 | 12.11 |
| ABA | 30 | 8.90 | 6.72 | 1.06 | 11.47 |
| CPPU | 5 | 8.57 | 6.20 | 0.98 | 11.34 |
| CPPU | 10 | 8.12 | 6.32 | 1.00 | 10.94 |
| ABA CPPU | 10 5 | 9.46 | 7.07 | 1.12 | 12.41 |
| ABA CPPU | 30 5 | 9.37 | 7.07 | 1.07 | 11.92 |
| ABA CPPU | 10 10 | 8.79 | 6.52 | 1.06 | 11.24 |
| ABA CPPU | 30 10 | 9.26 | 6.97 | 1.15 | 12.22 |
| OCE:ECE Ratio | | | | | |
| ABA CPPU | 10 5 | 1.07 | 1.07 | 1.07 | 1.06 |
| ABA CPPU | 30 5 | 1.10 | 1.11 | 1.04 | 1.07 |
| ABA CPPU | 10 10 | 1.04 | 0.97 | 0.99 | 0.99 |
| ABA CPPU | 30 10 | 1.14 | 1.08 | 1.10 | 1.14 |

Results

As seen in Table 4, above, the mixture of ABA and CPPU provided unexpected gain in spike weight, grain yield, and total above ground biomass at ratios of 2:1, 6:1, and 3:1. Further, the mixture of ABA and CPPU at a ratio of 1:1 provided unexpected gain in spike weight. Thus, mixtures of ABA and cytokinins provide unexpected yield in plants undergoing drought stress.

Example 5—Increasing Grain Yield in Rice

Method 32 pots of rice were grown in a greenhouse under ideal growing conditions. Specifically, rice was planted in growth media comprising sand and Pro-Mix® BX and grown for about 3-4 weeks in a growth cabinet at 24/18° C. day/night temperature under a 18/6 hour light/dark photoperiod. Next, spray applications of 0.025% v/v Latron B-1956® in water, 30 ppm ABA, 10 ppm CPPU, and a mixture of 30 ppm ABA and 10 ppm CPPU (n=8) were made using a tank sprayer at early grain filling stage (growth stage R6). Plants were then grown under ideal conditions for an additional 5-7 weeks. Plants were then destructively harvested and measured for yield of top six panicles, yield from other panicles (not top six panicles), yield of all panicles, yield per panicle and yield per top six panicles. Results can be seen in Table 5, below.

TABLE 5

| N = 8 | AI conc. (ppm) | Yield of Top 6 (grams) | Yield of Others (grams) | Yield of All (grams) | Yield per Panicle (grams) | Yield per Top 6 (grams) |
|---|---|---|---|---|---|---|
| Control | 0 | 15.00 | 10.90 | 25.90 | 2.17 | 2.50 |
| ABA | 30 | 15.75 | 12.72 | 28.47 | 2.34 | 2.63 |
| CPPU | 10 | 15.17 | 11.16 | 26.33 | 2.22 | 2.53 |
| ABA CPPU | 30 10 | 16.30 | 14.04 | 30.34 | 2.48 | 2.72 |
| OCE:ECE Ratio | | | | | | |
| ABA CPPU | 30 10 | 1.02 | 1.08 | 1.05 | 1.04 | 1.02 |

Results

As seen in Table 5, above, the mixture of ABA and CPPU provided unexpected gain in yield of top six panicles, yield from other panicles, yield of all panicles, yield per panicle and yield per top six panicles, at a ratio of 3:1. Thus, mixtures of ABA and cytokinins provide unexpected yield in plants.

Example 6—Increasing Grain Yield in Rice

Method 48 pots of rice were grown in a greenhouse under ideal growing conditions. Specifically, rice was planted in growth media comprising sand and Pro-Mix® BX and grown for about 3-4 weeks in a growth cabinet at 24/18° C. day/night temperature under a 18/6 hour light/dark photoperiod. Next, spray applications of 0.025% v/v Latron B-1956® in water, 30 ppm ABA, 30 ppm 6BA, 45 ppm 6BA, a mixture of 30 ppm ABA and 30 ppm 6BA, and a mixture of 30 ppm ABA and 45 ppm 6BA (n=8) were made using a tank sprayer at early grain filling stage (growth stage R5 to R6). Plants were then grown under ideal conditions for an additional 5-7 weeks. Plants were then destructively harvested and measured for yield of top six panicles, yield from other panicles (not top six panicles), yield of all panicles, yield per panicle and yield per top six panicles. Results can be seen in Table 6, below.

TABLE 6

| n = 8 | AI conc. (ppm) | Yield of Top 6 (grams) | Yield of Others (grams) | Yield of All (grams) | Yield per Top 6 (grams) | Yield per Panicle (grams) |
|---|---|---|---|---|---|---|
| Control | 0 | 17.70 | 6.54 | 23.42 | 2.95 | 2.88 |
| ABA | 30 | 19.14 | 5.22 | 23.70 | 3.19 | 2.95 |
| 6BA | 30 | 18.51 | 5.77 | 22.84 | 3.09 | 3.06 |
| 6BA | 45 | 18.63 | 5.49 | 24.12 | 3.11 | 2.94 |
| ABA 6BA | 30 30 | 20.47 | 6.41 | 26.08 | 3.41 | 3.44 |
| ABA 6BA | 30 45 | 19.27 | 6.04 | 25.31 | 3.21 | 3.18 |

TABLE 6-continued

| n = 8 | AI conc. (ppm) | Yield of Top 6 (grams) | Yield of Others (grams) | Yield of All (grams) | Yield per Top 6 (grams) | Yield per Panicle (grams) |
|---|---|---|---|---|---|---|
| OCE:ECE Ratio | | | | | | |
| ABA 6BA | 30 30 | 1.03 | 1.44 | 1.13 | 1.03 | 1.10 |
| ABA 6BA | 30 45 | 0.96 | 1.45 | 1.04 | 0.96 | 1.06 |

Results

As seen in Table 6, above, the mixture of ABA and 6BA provided unexpected gain in yield of top six panicles, yield from other panicles, yield of all panicles, yield per panicle and yield per top six panicles, at a ratio of 1:1. Further the mixture of ABA and 6BA provided unexpected gain in yield from other panicles, yield of all panicles and yield per panicle, at a ratio of 1:1.5. Thus, mixtures of ABA and cytokinins provide unexpected yield in plants.

Example 7—Increasing Grain Yield in Corn

Method

Corn was grown in the field in Seymour, Ill. in 2020. Spray applications of water, 2 g/HA ABA, 6 g/HA ABA and a mixture of 2 g/HA ABA and 2 g/HA 6BA (n=8) were made using a tank sprayer at the blister to milk stage (growth stage R2-R3). Plants were then grown until mature. Plants were then destructively harvested and measured for grain yield. Results can be seen in Table 7, below.

TABLE 7

| n = 8 | AI conc. (g/HA) | Grain Yield (bushels/acre) |
|---|---|---|
| Control | 0 | 241 |
| ABA | 2 | 225 |
| ABA | 6 | 234 |
| ABA 6BA | 2 2 | 251 |

Results

As seen in Table 7, above, the mixture of ABA and 6BA at total rate of 4 g/HA provided greater gain in grain yield in corn than application of ABA at 6 g/HA. Further, the addition of 6BA overcame the grain yield deficit caused by the application of ABA alone.

Example 8—Increasing Grain Yield in Soybean

Method

Soybean was grown in the field in Seymour, Ill. in 2020. Spray applications of water, 2 g/HA ABA, 6 g/HA ABA and a mixture of 2 g/HA ABA and 2 g/HA 6BA (n=8) were made using a tank sprayer at the beginning of seeding (growth stage R4 to R5). Plants were then grown until mature. Plants were then destructively harvested and measured for grain yield. Results can be seen in Table 8, below.

TABLE 8

| n = 8 | AI conc. (g/HA) | Grain Yield (bushels/acre) |
|---|---|---|
| Control | 0 | 97.31 |
| ABA | 2 | 96.57 |
| ABA | 6 | 93.80 |
| ABA 6BA | 2 2 | 103.84 |

Results

As seen in Table 8, above, the mixture of ABA and 6BA at total rate of 4 g/HA provided greater gain in grain yield in soybean than application of ABA at 6 g/HA. Further, the addition of 6BA overcame the grain yield deficit caused by the application of ABA alone.

Example 9—Increasing Grain Yield in Barley

Method

Barley was grown in the field in Pieres, Buenos Aires Province, Argentina from June 15 to Dec. 30, 2020. 2 g/HA ABA, 6 g/HA ABA and mixtures of 2 g/HA ABA and 2 g/HA 6BA and 4 g/HA ABA and 4 g/HA 6BA (n=8) were made using a tank sprayer at the beginning of milk grains (growth stage Zadoks 7.2). Plants were then grown until mature. Plants were then destructively harvested and measured for grain yield. Results can be seen in Table 9, below.

TABLE 9

| n = 8 | AI conc. (g/HA) | Grain Yield |
|---|---|---|
| Control | 0 | 5165 |
| ABA | 2 | 5319 |
| ABA | 6 | 5114 |
| ABA 6BA | 2 2 | 6222 |
| ABA 6BA | 4 4 | 6284 |

Results

As seen in Table 9, above, the mixture of ABA and 6BA at total rate of 4 g/HA and 8 g/HA provided greater gain in grain yield in barley than application of ABA at 2 or 6 g/HA. Further, the addition of 6BA overcame the grain yield deficit caused by the application of ABA alone.

What is claimed is:

1. A method of improving grain yield of a wheat plant comprising applying a mixture of (S)-abscisic acid (ABA) and forchlorfenuron to the wheat plant, wherein the weight ratio of ABA to the forchlorfenuron is from about 3:1 to about 2:1 and wherein mixture is applied during the reproductive or ripening stage of the growth cycle of the wheat plant and the wheat plant is subjected to drought stress conditions.

2. The method of claim 1, wherein the mixture is applied to the wheat plant between and including Feekes stage 10 and Feekes stage 11.4 of the growth cycle of the wheat plant.

3. The method of claim 2, wherein the mixture is applied to the wheat plant at Feekes stage 11 of the growth cycle of the wheat plant.

* * * * *